United States Patent [19]
Kikuchi et al.

[11] Patent Number: 5,501,120
[45] Date of Patent: Mar. 26, 1996

[54] SHIFT KNOB AND METHOD OF MAKING

[75] Inventors: Teishin Kikuchi; Hiroyuki Yamauchi; Seiichi Furuya; Kenichi Kan, all of Tokyo, Japan

[73] Assignee: Niles Parts Co., Ltd., Tokyo, Japan

[21] Appl. No.: 216,027

[22] Filed: Mar. 21, 1994

[30] Foreign Application Priority Data

Apr. 14, 1993 [JP] Japan ..................... 5-111071

[51] Int. Cl.⁶ .................. F16H 59/04; G05G 1/06
[52] U.S. Cl. .................. 74/543; 74/473 R; 74/523; 16/121; 16/DIG. 30; 264/513; 264/572; 264/129
[58] Field of Search ............ 74/523, 543, 473 R, 74/473 SW; 16/118, 121, DIG. 30; 264/513, 129, 572, DIG. 14

[56] References Cited

U.S. PATENT DOCUMENTS

| | | | |
|---|---|---|---|
| 2,285,963 | 6/1942 | Gits et al. | 16/121 |
| 3,484,808 | 12/1969 | Conterno | 16/121 X |
| 3,680,405 | 8/1972 | Naumann et al. | 74/523 |
| 3,795,156 | 3/1974 | Neuscheler | 74/523 |
| 4,774,850 | 10/1988 | Shovlin | . |
| 4,791,826 | 12/1988 | Behrens | 74/523 X |
| 4,807,490 | 2/1989 | Foggini | 74/543 |
| 4,822,962 | 4/1989 | MacCourt | . |
| 4,896,556 | 1/1990 | Takada | 74/523 |
| 5,247,849 | 9/1993 | Sato | . |
| 5,289,735 | 3/1994 | Kato et al. | 74/543 |

FOREIGN PATENT DOCUMENTS

| | | |
|---|---|---|
| 59-172024 | 9/1984 | Japan . |
| 61-45534 | 12/1986 | Japan . |
| 2-80844 | 3/1990 | Japan . |
| 4-3149 | 1/1992 | Japan . |
| 4-93558 | 8/1992 | Japan . |

*Primary Examiner*—Richard M. Lorence
*Attorney, Agent, or Firm*—Ronald P. Kananen

[57] ABSTRACT

A shift knob for use with automatic automotive transmissions has a one-piece body construction molded from a hard resin. The knob body is formed by gas injection molding, has a substantially uniform wall thickness and is covered with a soft resin. The knob body has a relatively thick bulbous grip portion at one end and gradually tapers to a slimmer lower end portion.

7 Claims, 5 Drawing Sheets

SHIFT KNOB AND METHOD OF MAKING

BACKGROUND OF THE INVENTION

1. Field of the Invention

The present invention relates to a shift knob for a shift lever of an automatic automotive transmission. More specifically, this invention relates to such a shift knob which obviates unsightly shrink marks and improves production efficiency.

2. Description of the Relevant Art

Japanese Utility Model No. 4-3149 discloses a conventional shift knob construction wherein a skeleton structure, which is made of a hard resin, is molded to form a one-piece body with a soft outer covering. However, this outer covering inevitably has portions which vary considerably in thickness. This variation induces a drawback that the thicker portions tend to shrink more than the thinner portions and thus gives rise to the so-called molding sink which impairs the appearance and aesthetic qualities of the shift knob.

Japanese Utility Model Preliminary Publication No. 4-93558 discloses an arrangement which has been proposed in an attempt to overcome the above-mentioned drawback. In this arrangement, the knob has a skeleton structure which is made of a hard resin and which is divided into two parts, i.e., a front half and a rear half, which can be assembled together by snapping one into the other or by means of screws. The assembled structure is then covered with a soft outer layer.

The two halves in this arrangement exhibit a thin-walled construction and provide a space between the two halves when assembled together. While this construction allows the respective halves to be of a thin-walled construction, it induces the drawback that, when the outer covering is formed, liquid resin is apt to wastefully leak between the two halves into the enclosed space.

The present invention was been developed in view of the aforementioned drawbacks and provides a shift knob which enables good production economy while also preventing the formation of shrink marks in the soft outer covering which detract from the appearance of the completed shift knob.

SUMMARY OF THE INVENTION

An object of the invention is therefore to provide a shift knob for use with an automatic automotive transmission wherein a soft outer covering having an essentially uniform thickness is molded onto a one-piece knob body which is made of a hard resin.

A further object of the invention to provide a shift knob which has a one-piece body construction and has a relatively voluminous hollow portion which has a predetermined wall thickness and which is formed by gas injection molding.

Another object of the invention is to provide a shift knob for use with an automatic automotive transmission where a soft outer covering covers a knob body made of a hard foaming resin.

In brief, a shift knob for use in an automatic transmission for automobiles has a knob body. The knob body is of a one-piece construction molded from a hard resin and includes a relative thick voluminous upper portion and a slim tapered lower portion. The relatively thick upper portion includes hollow sections which are formed by gas injection molding in a manner wherein walls of an essentially uniform wall thickness are formed. The exterior of the shift knob body is configured to facilitate coverage with a soft resin of essentially uniform thickness.

More specifically, a first aspect of the invention resides in a shift knob having a knob body for use in an automatic automotive transmission, the knob body comprising: an elongated one-piece construction molded from a hard resin, the knob body being of a substantially uniform wall thickness and covered with a soft resin; a relatively thick portion at one end of the elongated one-piece construction; and a gradually tapering portion which becomes slim toward the other end of the elongated one-piece construction, the relatively thick portion having a hollow portion therein formed by gas injection molding.

A second aspect of the present invention resides in a shift knob for an automatic automotive transmission, comprising: a knob body molded from a hard foaming resin which is foamed to a predetermined degree; and an outer covering of a soft material for covering the knob body, the outer covering having an essentially uniform thickness.

A further aspect of the invention resides in a shift knob comprising: a one-piece body having a relatively thick upper end portion and a gradually tapering portion which extends from the relatively thick portion to a relatively slim lower portion; wall means defining a hollow portion in the gradually tapering portion, the wall means having an essentially uniform wall thickness; and an outer covering layer formed over an external surface of the body, the outer covering layer having an essentially inform thickness.

A further important aspect of the present invention resides in that the above mentioned hollow portion is formed by molding the body using a gas injection molding technique.

Another important aspect of the invention resides in that the above mentioned body is configured to have a shape which facilitates the formation of the uniform thickness outer covering layer.

Yet another aspect of the invention resides in a method of molding a shift knob body which comprises the steps of: gas injection molding an elongate one-piece construction from a hard resin in a manner to form a relatively thick portion at one end of and a gradually tapering portion which becomes slim toward the other end, the relatively thick portion having a hollow portion formed by the gas injection in a manner to form essentially uniform thickness walls; and coating the outer surface of the one-piece construction with a covering of soft material having an essentially uniform thickness.

A further important aspect of the invention resides in the step of injecting a foaming resin into the hollow portion formed by the gas injection technique.

Still another aspect of the invention resides in a method of molding a shift knob which comprises the steps of: forming a one-piece knob body of a foaming resin which has been foamed to a predetermined degree; and covering the outer surface of the one-piece body with a covering of soft material having an essentially uniform thickness.

BRIEF DESCRIPTION OF THE DRAWINGS

The various features and attendant advantages of the present invention will become more apparent as a detailed description of the preferred embodiments is made with reference to the appended drawings in which:

FIGS. 3A, 3B and 3C illustrate the principle of gas injection molding used in forming the knob body in FIG. 1; wherein FIG. 3A shows a molten resin being injected into the a cavity, FIG. 3B shows pressurized gas being injected into the molten resin, and FIG. 3C shows the molded workpiece being taken out of the two mating molds;

DETAILED DESCRIPTION OF THE PREFERRED EMBODIMENTS

The preferred embodiments of the invention will now be described in detail with respect to the accompanying drawings.

First Embodiment

Figure 1:
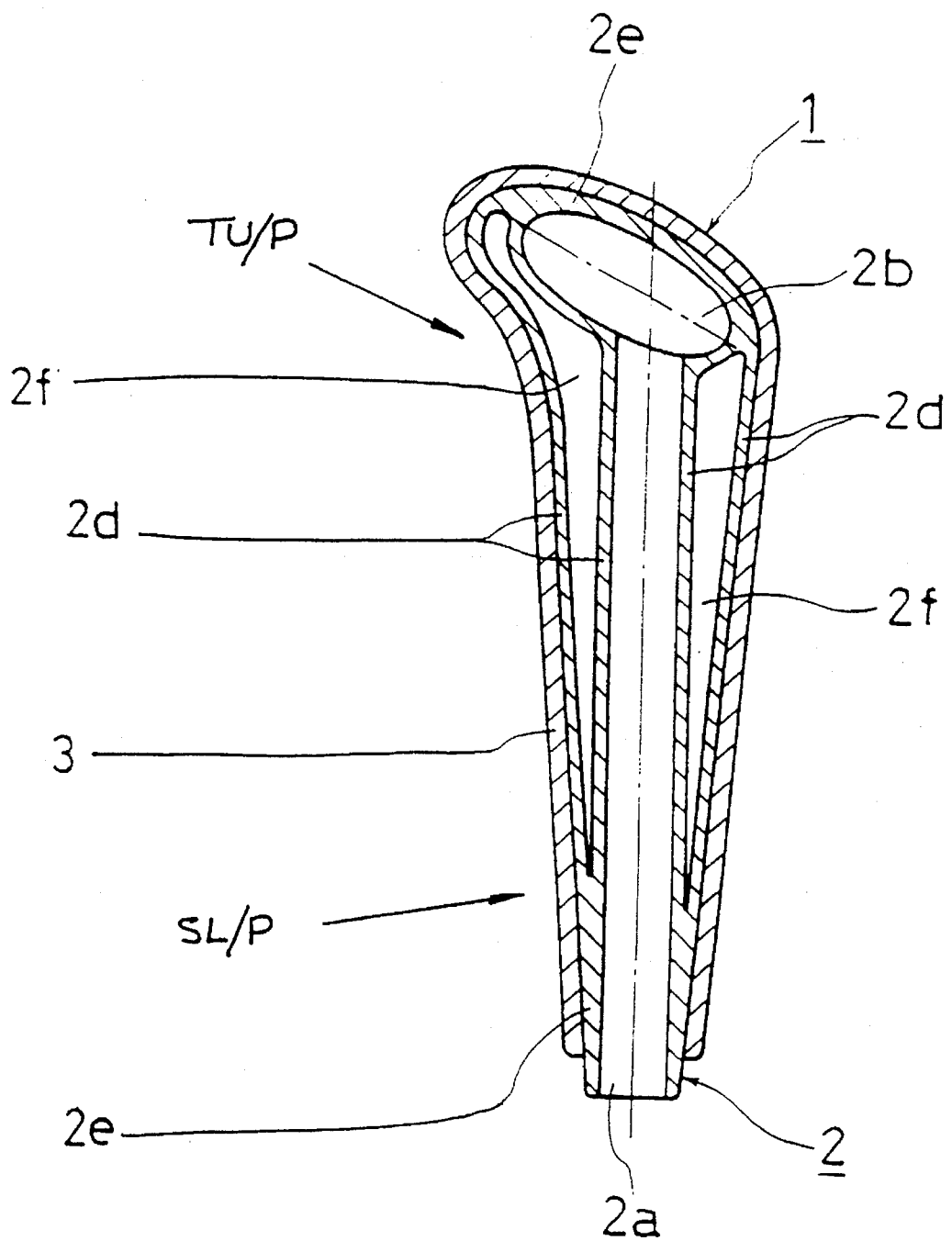
FIG. 1 is a cross-sectional view of a first embodiment of a shift knob according to the present invention.
Figure 2:
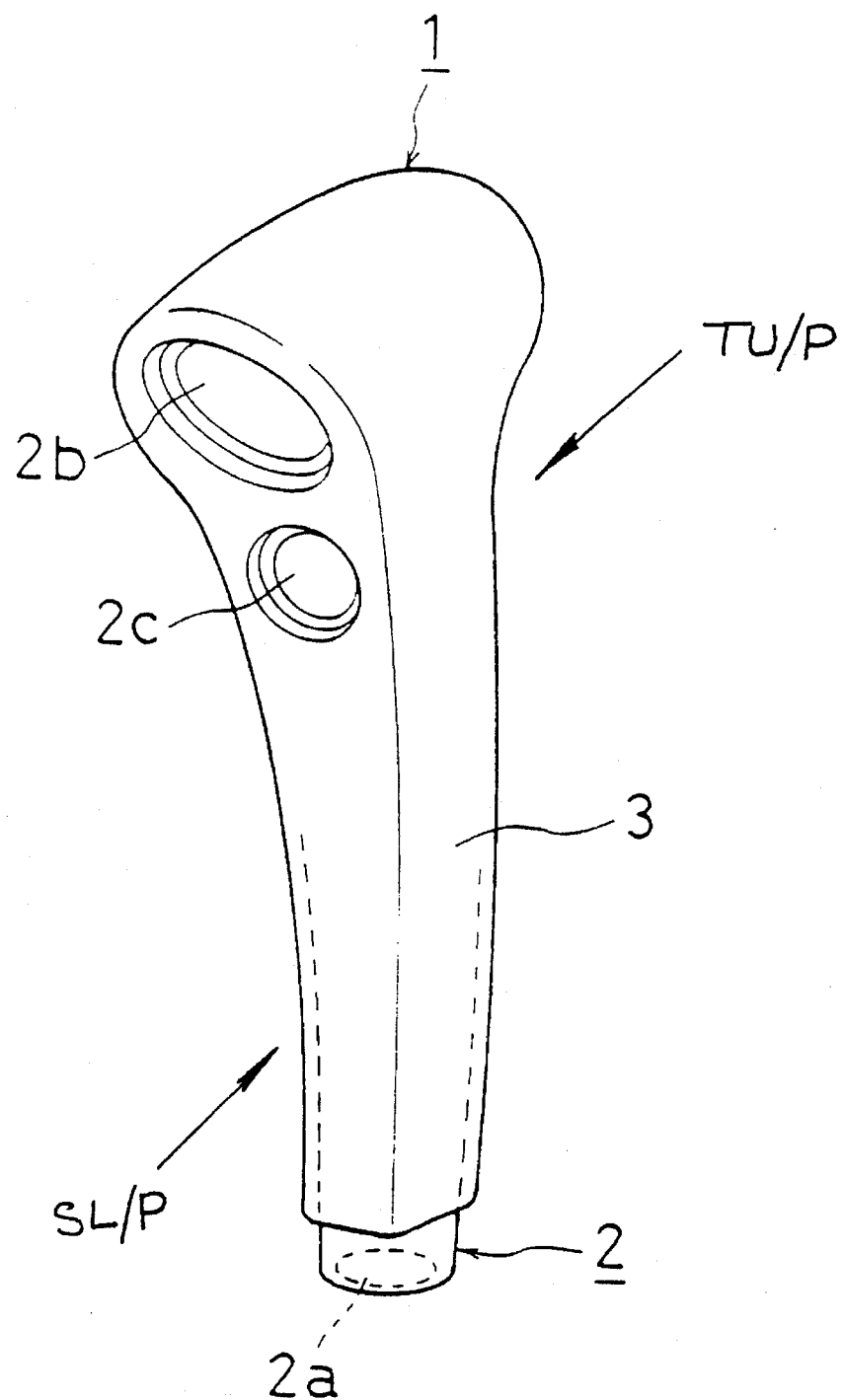
FIG. 2 is a perspective view of the embodiment shown in FIG. 1.

FIGS. 1 and 2 show a first embodiment of the invention. In this embodiment, a shift knob 1 is mounted to a shift lever, not shown, which is used for controlling the operation of an automatic automotive transmission. The shift knob 1 includes a knob body 2 made of a hard resin and an outer soft covering 3 which completely encloses the knob body 2.

In FIG. 1, a lever-receiving bore 2a extends longitudinally through the knob body 2 and has an opening at a lower end thereof. A button-receiving aperture 2b having an essentially elliptical cross-section, is provided at an upper end of the bore 2a in a manner to be slightly eccentric with respect to the axis of the lever-receiving bore 2a. In this embodiment the aperture 2b is oriented essentially normally with respect to the lever-mounting bore 2a. The button-receiving aperture 2b is open at one end. A switch-receiving aperture 2c is provided below the aperture 2b and opens in the same direction as the aperture 2b.

The whole knob body 2 is a one-piece construction. The lever-receiving bore 2a is receives a shift lever, not shown, of an automatic automotive transmission. The button-receiving aperture 2b is arranged to house a reciprocal detent button, not shown, which forms part of the shift lever detent mechanism, while the switch-receiving aperture 2c is adapted to receive an over-drive inhibit switch.

As shown in FIG. 1, the knob body 2 is configured so that the upper portion TU/P of the knob body 2 in which the button-receiving aperture 2b is formed, is relatively thick or voluminous, and tapers toward a slimmer lower end SL/P in which the open end of the lever-receiving bore 2a is located.

The bulbous nature of the upper section of the relatively thick portion TU/P allows a driver to comfortably hold the knob.

In this embodiment, the knob body 2 is formed such that it has a predetermined wall thickness 2e at the slim lower end SL/P which surrounds the lever-receiving bore 2a, and about the button-receiving aperture 2b. The relatively thick upper portion TU/P includes hollow portions 2f which induce most of the relatively thick portion to have a dual wall construction wherein the thickness 2d of the walls is essentially uniform.

The outer covering 3 is made of a soft resin such as polyvinyl chloride, or soft materials such as rubber, leather, and synthetic leather. The outer covering 3 has a substantially uniform wall thickness throughout to improve both appearance and touch.

The knob body 2 is formed by so-called gas injection molding, which is described below with reference to FIGS. 3A to 3B.

Figure 3A:
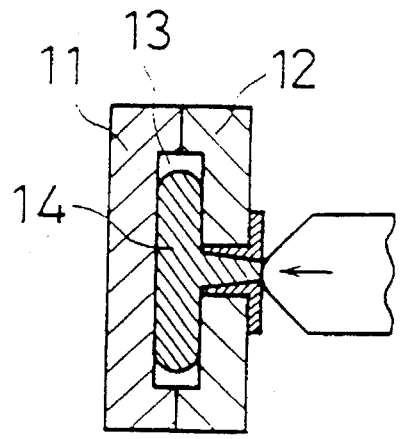
Figure 3B:
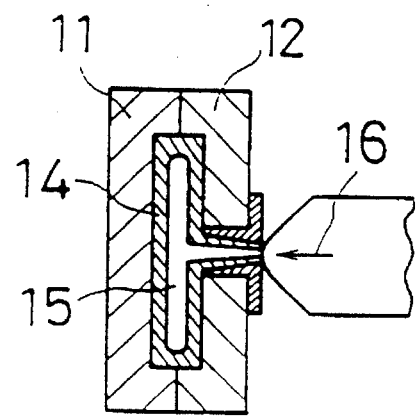

In the first stage, a molten resin 14 such as a thermoplastic resin, is injected into a cavity 13 defined by molds 11 and 12 in the manner depicted in FIG. 3A. Immediately following this, a pressurized gas 16 such as nitrogen, is injected along with the molten resin 14 to form a hollow portion 15 such as depicted in FIG. 3B, before the resin solidifies.

The injected resin 14 is then allowed to cool and solidify while the pressure of the gas 16 is maintained constant.

Figure 3C:
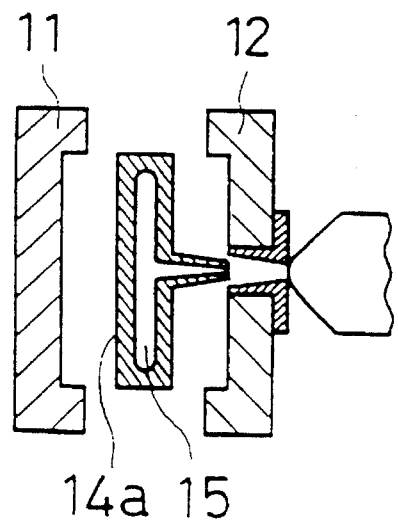

Finally, in the third stage, the molds 11 and 12 are removed to release the molded workpiece 14a in the manner shown in FIG. 3C.

In this manner, the molded workpiece 14a is formed to have a hollow portion 15 which is enclosed by walls having a generally uniform thickness.

The knob body 2 in this embodiment is molded using the aforementioned gas injection molding technique, so that the relatively thick upper portion TU/P has a hollow portion 2f defined by dual thin walls 2d which have substantially the same total thickness as the wall thickness 2e of the slim lower portion SL/P. Thus, the knob body 2 is a one-piece injected workpiece which is both light and simple.

The one-piece construction of the knob body 2 also allows the outer contour of the knob body 2 to be selected so that the outer covering 3 can be formed thereon in a manner which facilitates the achievement of the desired substantially uniform thickness.

To complete the shift knob body 2, a soft resin is molded onto the exterior surface to form a one-piece outer covering 3 in the manner depicted in FIG. 1. The outer covering 3 is made of a soft resin and exhibits substantially the same wall thickness all over shift knob body 2. Accordingly, the outer covering 3 exhibits an essentially uniform thermal shrinkage during cooling and solidification thus obviating molding sink and any associated impaired appearance.

Second Embodiment

Figure 4:
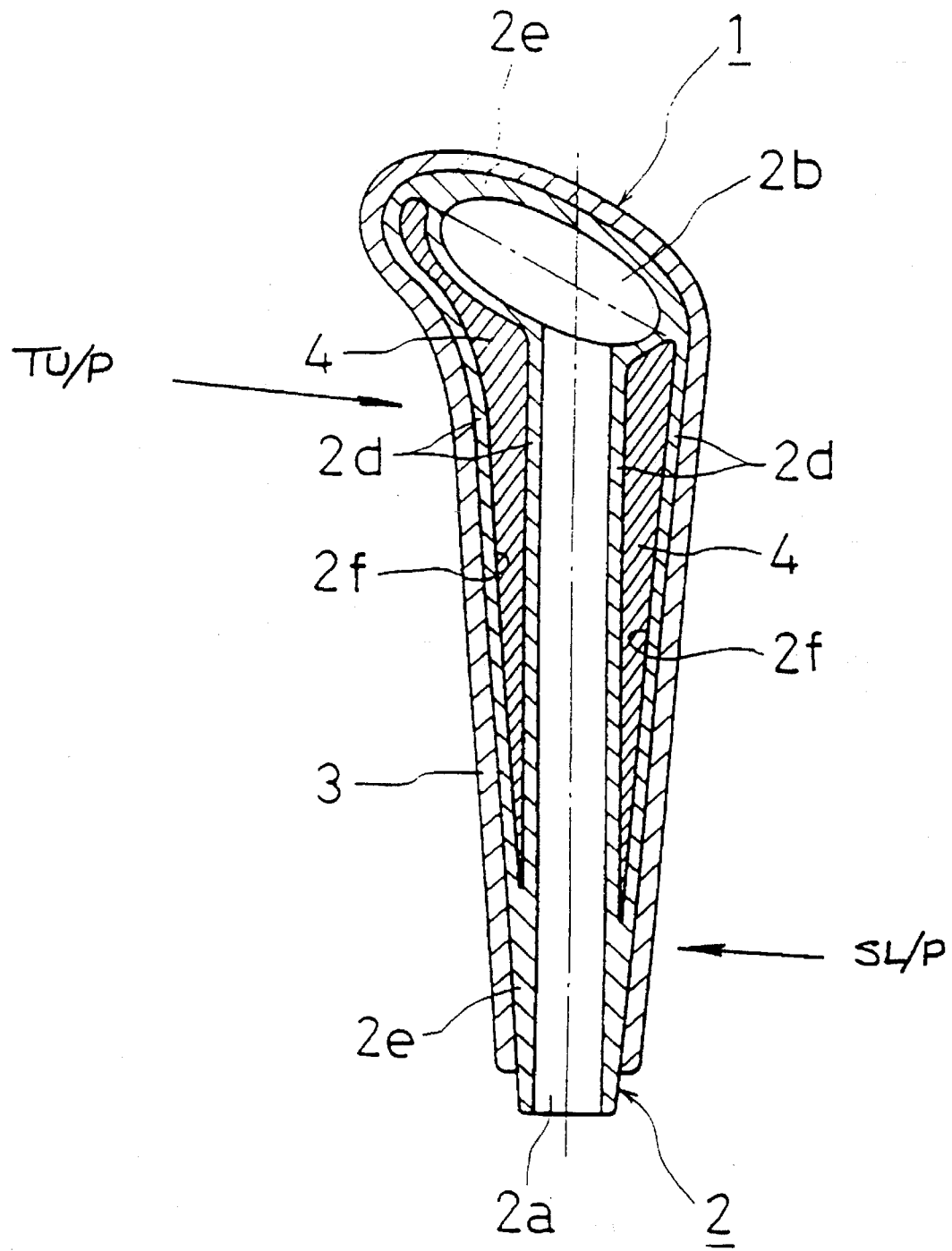
FIG. 4 is a cross-sectional view of a second embodiment of the invention.

A second embodiment is shown in FIG. 4. This second embodiment is of a construction where the hollow portion 2f of the first embodiment is filled with a foaming resin 4. Like elements have been denoted by like numerals and a description thereof is omitted for brevity.

The knob body 2 is shaped so as to facilitate the formation of an outer covering 3 having a substantially uniform wall thickness. The hollow portion 2f is for this purpose. The knob body 2 may withstand higher bending forces if ribs are provided within the hollow portion 2f, or if the hollow portion 2f is not formed at all. However, such constructions are undesirable since the whole structure becomes either more complex or heavier.

Thus, the hollow portion 2f of the second embodiment is filled with a foaming resin 4. The gas remaining within the hollow portion 2f is first evacuated, then the foaming resin 4 is injected thereinto to fill the hollow portion 2f, and subsequently allowed to cool and set. The foaming resin 4 is injected in molten form and has a gas such as nitrogen, carbon dioxide and butane injected thereinto as a foaming agent and in such a quantity as to provide a predetermined degree of foaming.

The shift knob reinforced in this manner is able to withstand higher bending forces due to the filling of the hollow portion 2f with the foaming resin 4. Further as the resin is foamed to a predetermined degree, the weight of the shift knob is not increased undesirably.

Third Embodiment

Figure 5:
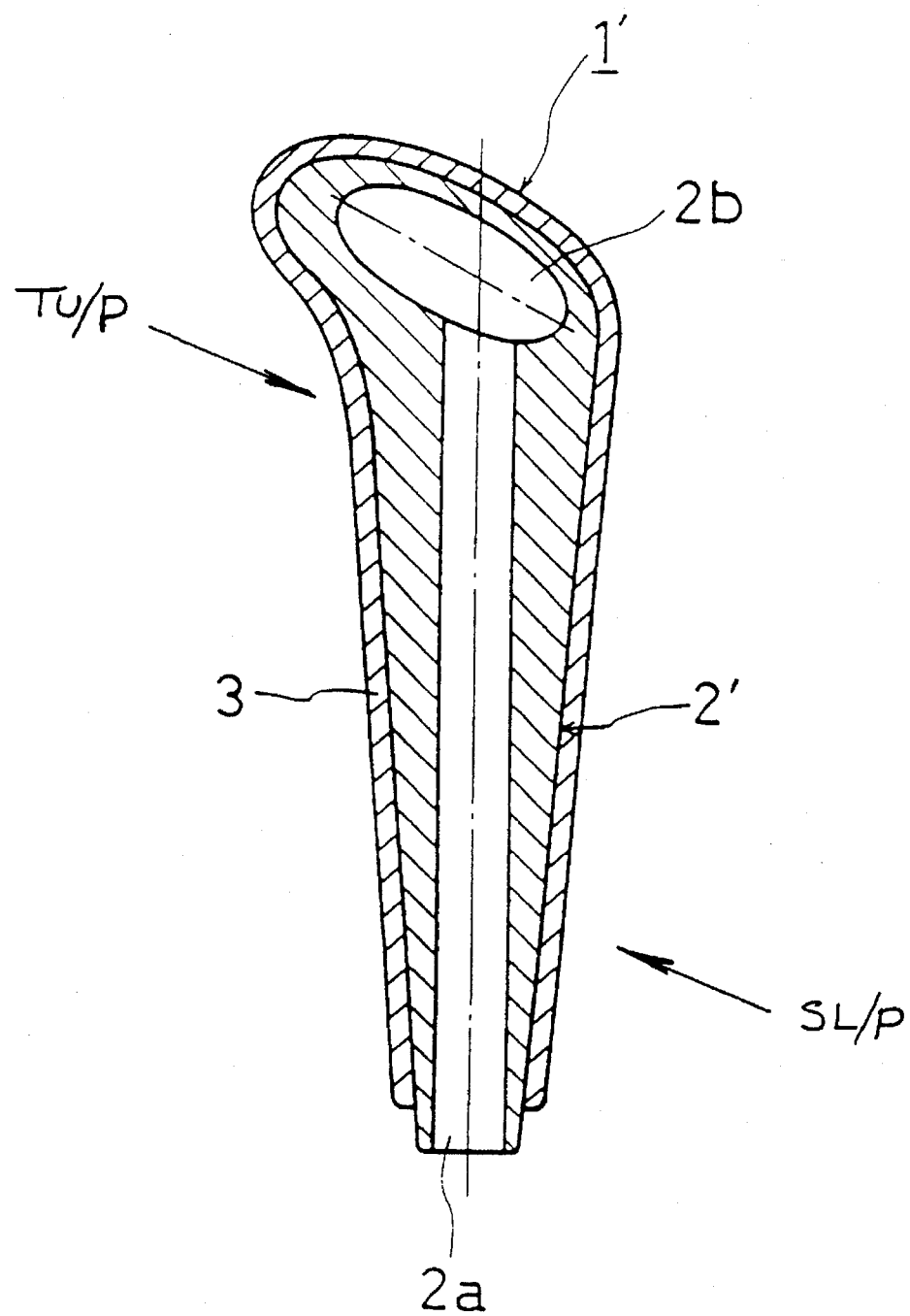
FIG. 5 is a cross-sectional view of a third embodiment of the invention.

A third embodiment is shown in FIG. 5. This third embodiment differs from the first embodiment in that the whole knob body 2 is molded from a foaming resin. Elements similar to those in the first embodiment have been assigned like numerals and a redundant description thereof is omitted.

The knob body 2' of this shift knob 1' is of a one-piece construction molded from a foaming resin. This foaming resin is the same material as the foaming resin 4 used in the second embodiment. The outer surface of the knob body 2' is covered with an outer covering 3 having a substantially uniform wall thickness.

A shift knob manufactured in the above manner is very light because the whole knob body 2' is made of a foamed resin.

Industrial Applicability

According to the present invention described above, the knob body is of a one-piece molded construction and is simple in shape. The outer surface of the knob body is completely covered with an outer covering having a substantially uniform thickness. This of course provides both good appearance and increases production efficiency.

What is claimed is:

1. A shift knob having a knob body for use in an automatic automotive transmission, said knob body comprising:
   an elongated one-piece construction molded from a hard resin and covered with a soft resin;
   a relatively thick portion at an upper end of said elongated one-piece construction, said relatively thick portion being formed with a first hollow portion which defines a button-receiving aperture, and a second elongate hollow portion which defines a lever receiving bore which extends essentially the full length of the knob body and communicates with the button-receiving aperture; and
   a gradually tapering portion which becomes slim toward a lower end of said elongated one-piece construction, said relatively thick portion and said gradually tapering portion including a third hollow portion which is formed about said second elongate hollow portion by gas injection molding, the first, second and third hollow portions cooperating to define a substantially uniform wall thickness structure throughout said knob body.

2. A shift knob according to claim 1, wherein said third hollow portion is filled with a foaming resin.

3. A shift knob comprising:
   a one-piece body having a relatively thick upper end portion and a gradually tapering portion which extends from said relatively thick portion to a relatively slim lower portion;
   wall means defining a first hollow portion which forms a button-receiving aperture in said relatively thick portion, a second hollow portion which forms a lever-receiving bore which extend from said button receiving aperture to an end of said gradually tapering portion, and a third hollow portion which is formed by gas injection molding, which surrounds said lever receiving bore and which extends from a location adjacent said button receiving aperture to a location proximate the end of said gradually tapering portion, said first, second and third hollow portions being so dimensioned and arranged as to be effective to cause said wall means to have an essentially uniform wall thickness; and
   an outer covering layer formed over an external surface of said body, said outer covering layer having an essentially uniform thickness.

4. A shift knob according to claim 3, wherein said body is configured to have a shape which facilitates the formation of said uniform thickness outer covering layer.

5. A shift knob according to claim 3, wherein said third hollow portion is filled with a foamed resin.

6. A method of molding a shift knob body comprising the steps of:
   gas injection molding an elongate one-piece construction from a hard resin in a manner to form a relatively thick portion at one end of and a gradually tapering portion which becomes slim toward the other end, said relatively thick portion having a first hollow portion forming a button-receiving aperture, a second hollow portion which forms a lever-receiving bore which extends longitudinally from said button receiving aperture through the shift knob body and has an opening at a lower end thereof, and a third hollow portion which is formed by said gas injection, said third hollow portion extending about said lever-receiving bore and cooperating with said first and second hollow portions in a manner to form essentially uniform thickness walls throughout said shift knob body; and
   coating the outer surface of said one-piece construction with a covering of soft material having an essentially uniform thickness.

7. A method as set forth in claim 6, further comprising the step of injecting a foaming resin into said third hollow portion.

* * * * *